United States Patent [19]

Pelt

[11] 4,100,800

[45] Jul. 18, 1978

[54] FLOW CONTROL ASSEMBLIES

[75] Inventor: Thomas E. Pelt, Milwaukee, Wis.

[73] Assignee: Badger Meter, Inc., Milwaukee, Wis.

[21] Appl. No.: 746,537

[22] Filed: Dec. 1, 1976

[51] Int. Cl.² .............................................. G01F 7/00
[52] U.S. Cl. ................................... 73/197; 137/512.1
[58] Field of Search ....................... 73/197; 137/512.1

[56] References Cited

U.S. PATENT DOCUMENTS

| | | | |
|---|---|---|---|
| 1,128,657 | 2/1913 | Burton | 73/197 |
| 1,142,141 | 6/1915 | Burton | 73/197 |
| 1,245,740 | 11/1917 | Kreig | 73/197 |
| 3,395,578 | 8/1968 | Simonds, Jr. | 73/197 |

*Primary Examiner*—Herbert Goldstein
*Attorney, Agent, or Firm*—Neuman, Williams, Anderson & Olson

[57] ABSTRACT

A compound meter assembly is provided having primary and secondary passageways housing a high flow rate meter and a low flow rate meter, respectively. A composite flow responsive first valve is disposed within the secondary passageway and moves to a substantially closed position when the liquid flow through said passageway is increasing and exceeds a first predetermined rate. Upon substantial closing of the first valve, a substantial momentary pressure impulse is created and the liquid flow is diverted from the secondary passageway to the primary passageway. A composite pressure responsive second valve is disposed within the primary passageway and includes a gate member movable between open and closed positions, and a weighted operating member movable independently of the gate member and adapted to close the latter by pivotal movement and to lock the latter in a closed position by a wedging action until the momentary pressure impulse is created and exerted on the gate member and the liquid flow is diverted from the secondary passageway to the primary passageway. The composite first valve includes a first element, which moves to reduce the flow restriction therethrough as the second valve closes, and a cooperative second element to effect the aforementioned substantial closing of the secondary passageway.

29 Claims, 8 Drawing Figures

FLOW CONTROL ASSEMBLIES

BACKGROUND OF THE INVENTION

This invention constitutes improvements in the Compound Meter Assembly as disclosed in copending application Ser. No. 746,536, filed Dec. 1, 1976, concurrently herewith, of Allen C. Bradham, III and Edward A. Seruga.

Various meter assemblies of the type frequently referred to as compound meters have heretofore been provided for measuring variable flow rates within a piping system. Such assemblies, however, because of certain structural characteristics have been beset with one or more of the following shortcomings: the assembly is incapable of accurately measuring the flow rate where the latter varies over a wide range; the assembly is of bulky, costly and complex construction; the flow paths through the assembly are such that substantial pressure drops occur within the assembly; the assembly is susceptible to harmonic oscillation or chattering when measuring the liquid flow; and servicing of the assembly is a difficult and awkward operation requiring shut down of the assembly for inordinate periods of time and oftentimes requiring removal of the entire assembly from the piping system.

The aforementioned application Ser. No. 746,536 discloses a new compound meter assembly which substantially overcomes the above-noted problems. The instant invention, however, is directed to further improvements in such assemblies, and particularly to improving the closing and sealing action of valves, such as the valve disposed in the primary passageway, and to providing an improved trigger valve arrangement for controlling the closing as well as the opening of the primary passageway valve.

SUMMARY OF THE INVENTION

It is an object of this invention to provide improved flow control assemblies.

It is a specific object of this invention to provide an improved compound meter capable of accurately measuring fluid flow over a wide range of flow rates.

It is a further object of this invention to provide improved automatically-operating valve assemblies having different opening and closing operational parameters.

It is a still further object of this invention to provide improved trigger valve assemblies for automatically and accurately controlling the closing as well as the opening of other flow valves, such as the primary flow valves, embodied in compound meters.

Further and additional objects will appear from the description, accompanying drawings and appended claims.

In accordance with one embodiment of the invention a compound meter assembly is provided having primary and secondary passageways housing a high flow rate meter and a low flow rate meter, respectively. A composite flow responsive first valve is disposed within the secondary passageway and is adapted to move from a normally open position to substantially closed position when the liquid flow through said passageway is increasing and exceeds a first predetermined rate. Upon the first valve assuming said substantially closed position, a momentary high pressure pulse is created and the liquid flow is diverted from the secondary passageway to the primary passageway. A composite second valve is disposed within the primary passageway and includes a gate member movable between open and closed positions, and a weighted operating member movable independently of the gate member and adapted to close the latter by pivotal movement and to lock the latter in a closed position by a wedging action until the pressure pulse is exerted on the gate member causing same to be released from said closed position and the liquid flow is substantially diverted from the secondary passageway and causes said gate member and said weighted member to simultaneously move to a fully open position. The composite first valve includes a first element which in its open, or down, position produces a predetermined restriction to the liquid flow through the secondary passageway, and when in its up position, produces a lesser restriction to the liquid flow. The valve first element moves to its up position when the liquid flow exceeds a predetermined first flow rate. The first valve also includes a cooperative second element which normally assumes an open, or down, position and is adapted to move to an up position when the liquid flow exceeds a predetermined second flow rate. When the second element of the first valve is in the up position, flow through the secondary passageway is substantially closed off producing a momentary high pressure impulse which is transmitted to the second valve opening same and thereby causing the liquid flow to be diverted from the secondary passageway to the primary passageway.

For a more complete understanding of the invention reference should be made to the drawings, wherein.

Figure 6:
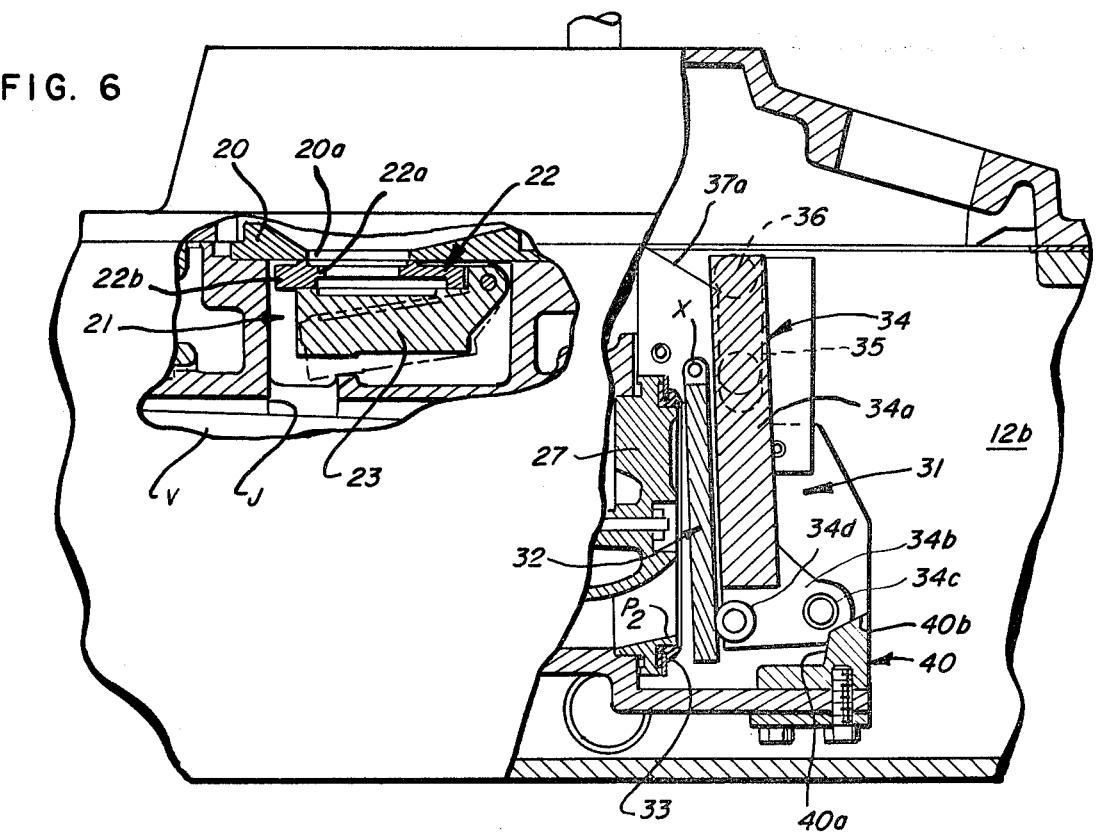
FIG. 6 is an enlarged, fragmentary side elevational view partially in vertical section of the metering section showing the first valve substantially closed and the primary passageway valve just after the momentary high pressure impulse has been exerted on the gate member causing the latter to be released from its fully closed position.
Figure 7:
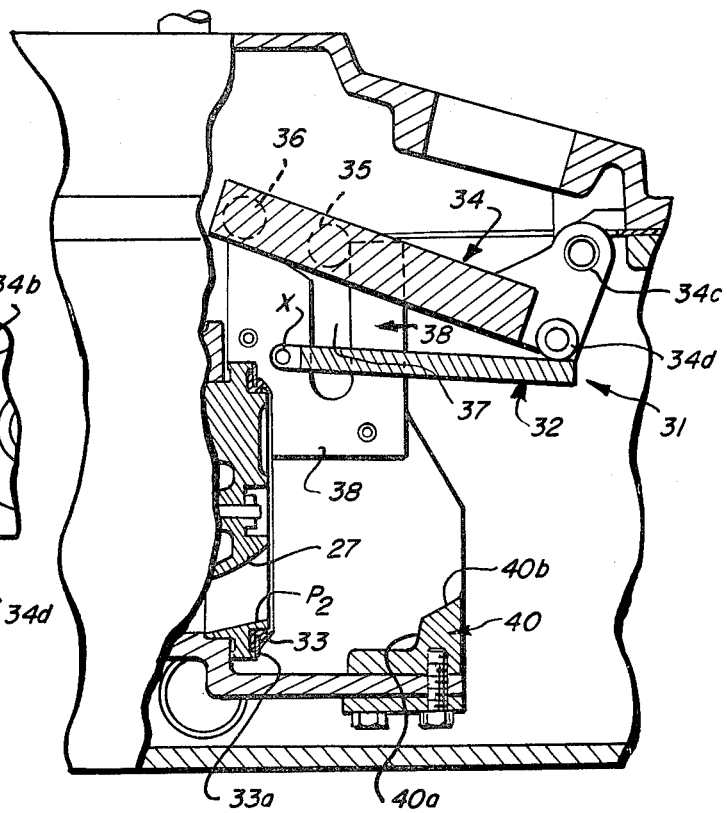

FIG. 7 corresponds to a portion of FIG. 6 but showing both components of the primary passageway valve in fully opened positions.

Figure 8:
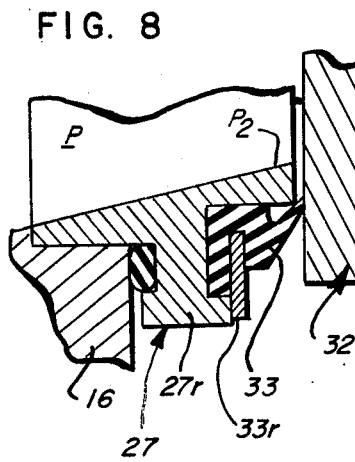

FIG. 8 is an enlarged, fragmentary vertical sectional view showing the gate member in a sealed, closed relation with respect to the downstream end of the primary passageway.

Figure 1:
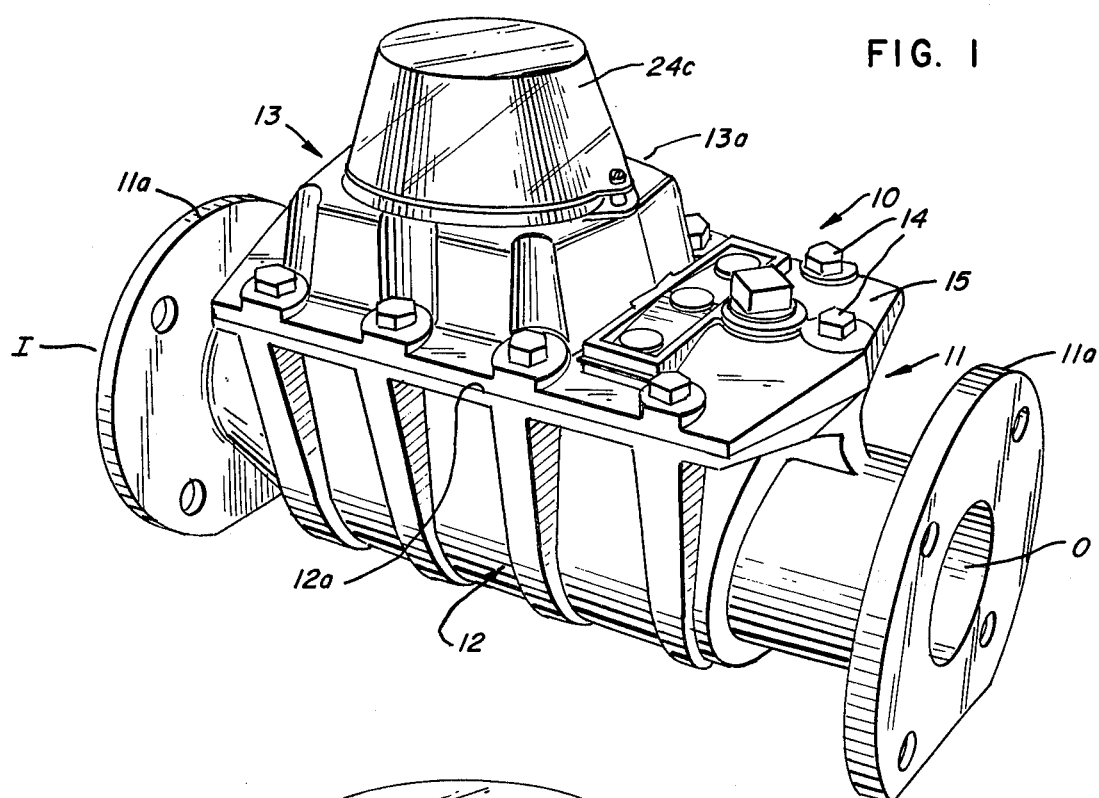
FIG. 1 is a perspective top view of one form of an improved meter assembly employing teachings of this invention.
Figure 2:
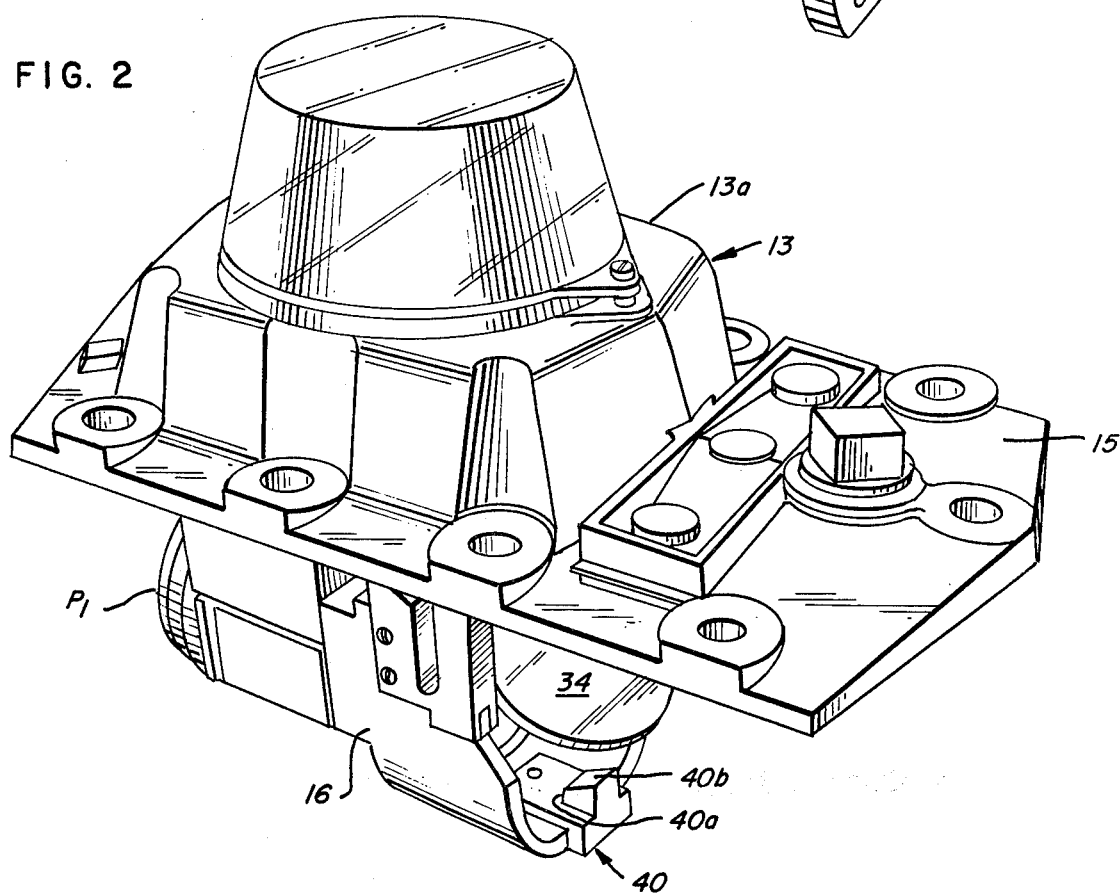
FIG. 2 is an enlarged perspective view of the metering section of the assembly of FIG. 1 subsequent to the section having been removed from a complemental housing section which normally remains in place with the piping system.
Figure 3:
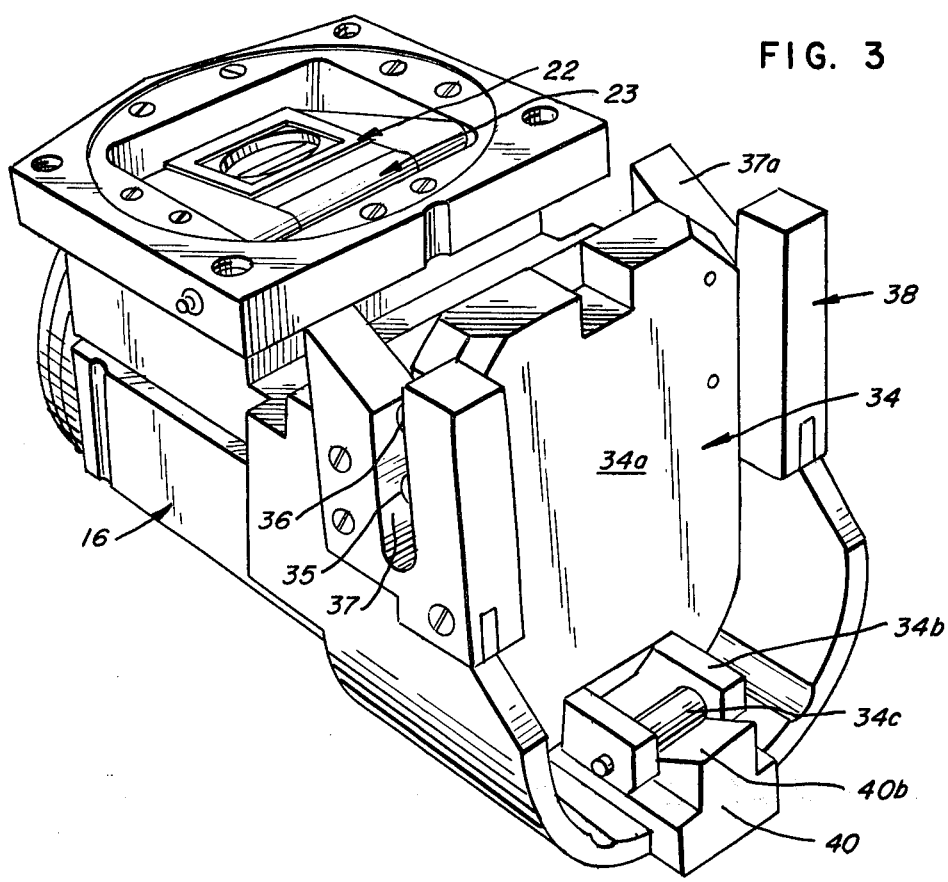
FIG. 3 is an enlarged fragmentary perspective view of a portion of the metering section of FIG. 2, i.e., with the data reading means, low flow rate meter, cover plate and partition removed therefrom and with the valve of the primary passageway shown in its closed position and the valve of the secondary passageway shown in its open position.
Figure 4:
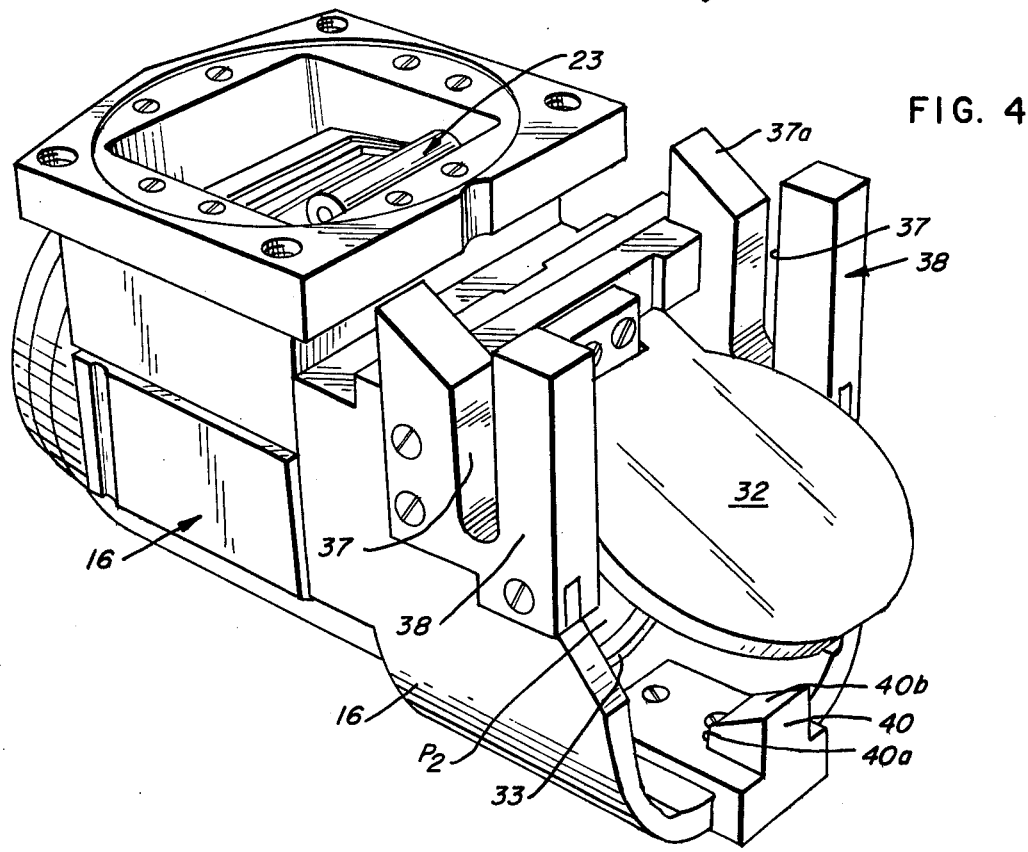
FIG. 4 is similar to FIG. 3 but showing the gate member of the primary passageway valve in an open position and with the weighted operating member for the gate member and one component of the secondary passageway valve removed.

Referring now to the drawings and more particularly to FIGS. 1 and 2, one form of an improved meter assembly 10 is shown prior to being installed in a piping system, not illustrated. The assembly is adapted to utilize two meters, each of which may be of a conventional type, to accurately measure the liquid flow in the piping system which may vary over a wide range of flow rates. The assembly includes a housing 11 comprising a first section 12 and a complemental second or metering section 13 which is removably secured thereto by a plurality of suitable fasteners 14. Housing section 12 is provided with an inlet I and an outlet O which are normally connected to corresponding portions of the piping system. The inlet and outlet are delimited by annular collars or flanges 11a which facilitate connection to the piping system. The particular embodiment illustrated and described below is designed for use in a 3 inches diameter piping system, and also is suitable for use in a 2 inches system by variation of the outer housing to provide connecting flanges suitable to the 2 inches system. Of course, a wide variety of sizes of corresponding units may be provided for other piping systems.

Housing section 12 normally remains in place within the piping system. Section 13, as seen in FIG. 2, is provided with a cover portion 15 which is sized so as to completely overlie and close-off the upper open side 12a of section 12 when the sections are in assembled relation, see FIG. 1. Depending from the cover portion 15 is an integral metering assembly including a carriage 16 in which are formed primary and secondary passageways P and S, respectively, as will be observed in FIG. 5. The primary passageway has a substantially rectilinear elongated configuration which is in substantial alignment with the inlet and outlet. Thus, liquid flow through the primary passageway is substantially straight-line, thereby resulting in a minimum pressure drop when there is full flow through the primary passageway.

When sections 12 and 13 are in assembled relation the upstream end $P_1$ of the primary passageway is aligned with the inlet I, formed in housing section 12. The exterior of the carriage 16 defining passageway end $P_1$ is in sealing contact with a complemental portion of the interior of housing section 12 as at an annular O-ring 16a, see FIG. 5.

The inlet end of the secondary passageway S communicates with primary passageway P at juncture J which is disposed downstream of inlet I of housing section 12. The secondary passageway is nonrectilinear and comprises a first cavity 17 spaced above the juncture J, a second cavity 18 disposed above cavity 17 and separated therefrom by a partition 20, and a port 25 between cavity 18 and an upper interior portion 19 of the housing 13. Portion 19 communicates with the portion 12b which is disposed adjacent outlet O. Partition 20 is provided with an opening 20a which communicates with the two cavities.

Flow from cavity 17 to cavity 18 through opening 20a is controlled by a composite valve 21, sometimes referred to as a trigger valve. Valve 21 includes a hingedly mounted first member 22 having an aperture 22a formed therein which is smaller in size than opening 20a and is in registration therewith when member 22 is moved to an up or substantially closed position, as in FIG. 6. When member 22 is in the up position, it subtends and is in contact with the portion of the partition 20 circumjacent the opening 20a. Valve 21 also includes a weighted imperforate member 23 which is hingedly mounted about the same axis as member 22 but is movable independently thereof. The hinge axis for members 22, 23 is substantially horizontal. Member 22 rests against member 23 when both members are in their normal down or open position, see FIG. 5, whereby member 23 closes the aperture 22a. The member 23 also substantially closes the aperture 22a when both members are in the up or closed position, shown in full lines in FIG. 6.

Figure 5:
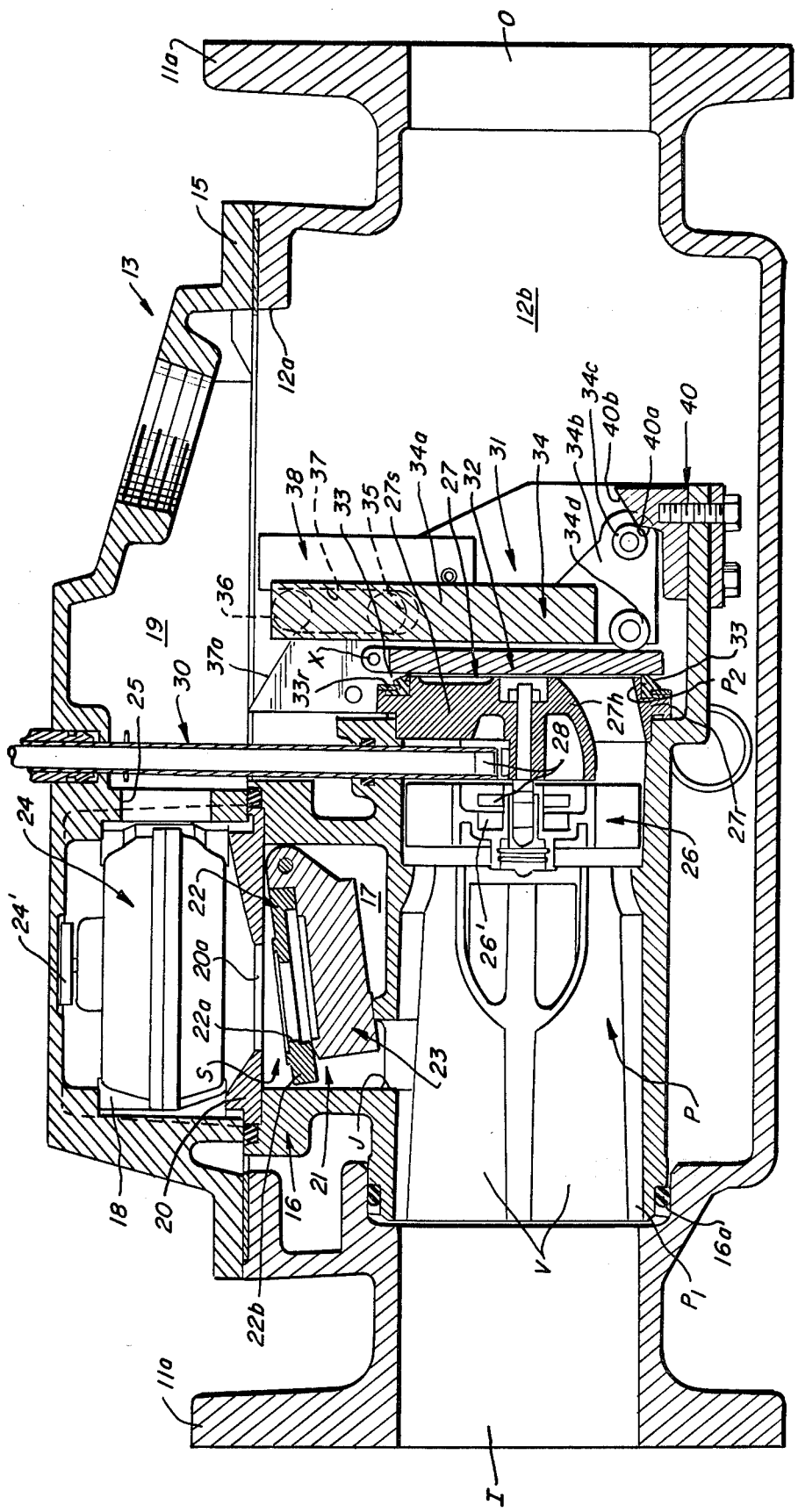
FIG. 5 is an enlarged, fragmentary vertical sectional view of the assembly of FIG. 1 taken along substantially the flow axis through the primary passageway and showing the primary passageway valve thereof in a fully closed position and both components of the valve in the secondary passageway in open positions; the data reading means is not shown.

The member 22 has a lateral dimension relative to the lateral dimensions of cavity 17 such that there is a restriction to flow of fluid through the cavity 17 around or past member 22 even though the member 22 is in its open position, see FIG. 5. Such flow restriction is greater than the restriction to flow through the aperture 22a when the member 22 is in its up or substantially closed position relative to partition 20, as will be referred to further below. Valve member 23 is of a lesser lateral extent and of greater weight than member 22. Because of the lesser extent and greater weight of member 23, higher flow rate through passageway S is required in order to pivot member 23 to an up position wherein it subtends and contacts the previously up positioned member 22 than is required to move member 22 to its up position. Once member 23 has assumed its up position, see FIG. 6, liquid flow through the secondary passageway S is most restricted so long as the member 23 remains in its up position. Both members will move to their down, or open, positions after the valve 31 opens, as described further below. A small liquid flow through or around member 23 exists, when both members 22, 23 are in their up positions so as to prevent sediment accumulation and related sticking of the components of the meter 24 disposed within cavity 18.

Meter 24, located in a fixed position within cavity 18, is preferably a conventional nutating disc-type similar to that disclosed in U.S. Pat. No. 3,248,583. Meter 24 is a positive displacement meter and is particularly suitable for accurately measuring low rates of liquid flow (e.g., below approximately 17 g.p.m.). Once the liquid has flowed through meter 24, it leaves cavity 18 through the opening 25 and into interior portion 19 of section 13 and portion 12b of section 12 before exiting through outlet O, see FIG. 5. The metering movement of the disc, not shown, of meter 24, which is responsive to the liquid flow through the secondary passageway S, is transmitted to data reading mechanism such as a totalizer register which is disposed beneath a transparent cover 24c (FIG. 1) by means of a magnetic coupling 24'.

When members 22 and 23 of valve 21 are pivoted to their up positions relative to opening 20a, see FIG. 6, the liquid flow through the assembly 10 is substantially diverted momentarily from the secondary passageway S to the primary passageway P thereby causing a substantial pressure impulse to be created on the upstream side of valve 31.

Disposed coaxially within primary passageway P and downstream from juncture J is a conventional, turbine type meter 26, which is capable of accurately measuring high liquid flow rates over a wide range. This meter may be of a conventional axial flow turbine type, of which one recent improved example is disclosed in U.S. Pat. No. 3,972,233. The meter is retained in position within the passageway by a suitable stationary retainer 27 comprising a hub 27h supported by struts 27s on a mounting ring 27r. The rotational movement of a flow responsive turbine impeller 26', which comprises a component of meter 26, is imparted by means of a magnetic coupling 28 to an upright or transversely extending shaft 30 which is adapted to be rotated about its longitudinal axis. The lower end of shaft 30 is supported by a bearing in retainer 27 while the upper end thereof terminates with a drive connection to the aforementioned data reading mechanism mounted on the upper portion 13a of the housing section 13, see FIG. 2. The upper or distal end of shaft 30 is connected by a gear train, not shown, to a suitable gauge and an odometer counter, which summarizes the readings of meters 24 and 26. The gauge and counter are not shown but comprise components of the data reading mechanism.

In order to provide a more accurate measurement by meter 26 of the liquid flow through passageway P, flow straightening vanes V may be located within the passageway, upstream of the meter 26. The vanes are symmetrically arranged within the passageway P and extend radially inwardly from the wall of said passageway.

Disposed downstream of meter 26 is a pressure responsive, composite valve 31. The valve 31 normally assumes a closed position, see FIG. 5, under low flow rate conditions while the liquid flow is through the secondary passageway S. Valve 31 includes a lightweight gate member 32, preferably formed of a plastic material which is inert to the flowing liquid. The upper portion of the gate member is connected so as to pivot about a fixed horizontal axis X which is offset from the discharge end $P_2$ of the primary passageway P. When gate member 32 is in its closed position, it sealingly engages an annular lip-type seal 33 which delimits the discharge end $P_2$ of passageway P and is held in place by a retainer ring 33r, see FIGS. 5 and 8.

Valve 31 also includes a weighted member 34, which is disposed on the downstream side of gate member 32 and is in engagement therewith when the gate member 32 is in sealing contact with seal 33. Member 34 includes a plate section 34a, a transversely disposed extension 34b formed on the lower edge of section 34a, a follower roller 34c carried by the extension 34b and positioned downstream of the plate section 34a, and a second roller 34d spaced forwardly of roller 34c and being adapted to engage the downstream surface of gate member 32 and retain the latter in its closed position. Mounted on the upper portion of plate section 34a and extending laterally from opposite sides thereof are pairs of guide rollers 35 and 36.

The guide rollers 35 and 36 on each side of plate section 34a are disposed within an upwardly extending slot 37 formed in an adjacent stationary guide 38. As seen in FIG. 5, one side of the slot 37, adjacent the upper end thereof, is angularly disposed and forms a ramp-like surface 37a. The upper guide roller 36 engages on surface 37a for pivotally supporting the member 34 when that member is in an open position, as seen in FIGS. 6 and 7.

Disposed downstream from member 34 and aligned with extension 34b thereof, when the member 34 is in its closed position, is a stationary member 40 secured to carriage 16. The upstream and upper surfaces of member 40 form, respectively, a first cam segment 40a which is steeply inclined (e.g., approximately 8° to the vertical), and a second cam segment 40b which extends downstream and upwardly at a more gradual angle (e.g., approximately 35° from the horizontal) from the upper edge of segment 40a.

When the weighted member 34 is moving to a closed position from its fully opened position, FIG. 7, the member 34 will pivot in a clockwise direction about rollers 36 as an axis. However, simultaneously with the pivoting movement of the member 34 about rollers 36, the latter are moving downwardly along ramp-like surface 37a as rollers 35 move downwardly along slots 37. Upon the rollers 36 reaching the lower ends of surfaces 37a, roller 34c carried by the extension 34b of member 34 will contact member 40 at the upper edge of cam segment 40a. Roller 34c thereafter moves along the steeply inclined cam surface 40a as the member 34 drops by gravity, and the rollers 34c and 34d will be wedged between the downstream side of gate member 32 and the cam segment 40a of stationary member 40 to force gate 32 against the seal 33. To release rollers 34c and 34d from their wedged position requires the substantial pressure impulse to be applied to the upstream side of the closed gate member whereby the upwardly directed vector of the resulting applied force at cam segment 40a will be such as to overcome the weight of member 34 and any friction existing at the rollers 34c and 34d.

It should be noted that as roller 34c engages and moves downwardly along cam segment 40a during closing, a closure force is applied to gate member 32 via roller 34d and the gate member moves compressibly against seal 33 about pivot X without any sliding action. Conversely, upon opening, the upstream face of gate member 32 will move away from seal 33 without causing a sliding action to occur between the gate member and the seal. By avoiding such sliding action, unpredictable friction forces are avoided during the seating and unlocking movements. A simplified and efficacious sealing arrangement is obtained while retaining the basic dual modes of closing and opening actions by force of gravity as in the apparatus of the aforementioned application Ser. No. 746,536. Moreover, the wear life of the seal 33 is significantly extended thereby reducing maintenance costs and the like.

During opening of valve 31, once roller 34c has reached the top of cam segment 40a (FIG. 6), the rollers 36 will re-engage the surfaces 37a and the force of the diverted flowing liquid will cause the gate member 32 and weighted member 34 to pivotally move as a unit toward the fully opened position, as seen in FIG. 7. The valve 31 will remain open in its pivotal mode so long as the liquid flow within the primary passageway remains above a predetermined level (e.g., 7 g.p.m. for the described embodiment). When the flow diminishes to this predetermined level, the valve member 34 will have returned to a position in which rollers 36 pass off of ramps 37a and roller 34b is over the upper edge of ramp 40a. At this point member 34 drops by gravity into its wedging mode locking gate member 32 in its fully closed position against seal 33 as noted above.

The overall operation of the described meter is similar to the meter described in the aforementioned application Ser. No. 746,536, but with improved closure action and seating of the primary valve as noted above and improved control over the closing point of the primary valve by the composite trigger valve 21.

By way of further illustration, the operation of this improved embodiment will be described assuming an initial condition of no flow or very low flow in which both valve members 22 and 23 are in their down positions and valve 31 is fully closed, as in FIG. 5. As the flow rate increases and exceeds a first predetermined amount (e.g., approximately 7-10 g.p.m.), member 22 will move (clockwise as seen in FIG. 6) to its up or substantially closed position. Until the liquid flow through the secondary passageway S has increased to a second predetermined rate (e.g., approximately 17 g.p.m.) the weighted member 23 will remain in its open or down position as seen in FIG. 5. Independent movement of member 22 to its closed position is due to the flowing liquid engaging the portion 22b of the member which protrudes beyond the periphery of member 23, as seen more clearly in FIG. 5 and the pressure drop thereacross. This closure of member 22 during crossover-up (i.e., during increasing flow) provides a reduction of pressure across valve 31 which, however, is insufficient to cause the latter to move from its closed position.

When the flow rate reaches the second predetermined rate, member 23 moves to its up position thereby causing substantial flow through the meter to be momentarily interrupted and a sudden substantial pressure drop to be created between inlet I and outlet O producing a pressure impulse of high magnitude. The pressure impulse is momentarily exerted on the upstream surface of gate member 32 whereby a resultant upward force component is imparted at the steep angled interface of roller 34c and cam segment 40a which will be sufficient to release member 34 from its wedged position (see FIG. 6). Once member 34 has been released from its wedged position, closure plate 32 will react to the diverted liquid flow and move to its fully open position (see FIG. 7) by pivoting about axis X and by movement of member 34 about rollers 36. When valve 31 opens, thereby establishing flow through the primary passage and through meter 26, there is a prompt drop in pressure loss across the assembly notwithstanding that the flow rate continues to increase. With this drop, valve member 22 and 23 return to their normal open or down positions. Thereafter flow continues through both meters 24 and 26. However, the rate of flow is more than adequate to insure that the meter 24 will start promptly and will be operating within its range of acceptable accuracy of flow measurement. It is not until the flow rate through the assembly exceeds approximately 150 g.p.m. that there is once again any appreciable pressure loss across the assembly. In this high flow area of operation the valve members 22 and 23 again will move to their up positions and prevent any overspeed operation of the meter 24 as the pressure drop increases.

As the flow through the meter assembly 10 diminishes, valve members 22 and 23 will open below the high flow cut-off, e.g., 150 g.p.m., and thereafter will remain open, and valve member 34 will move plate 32 toward its closed position. The valve member 22 automatically will move off of member 23 and return to its up or closed position at a first predetermined flow rate through the meter, e.g., approximately 7 g.p.m., while member 23 remains open. When member 22 is in up position and member 23 is in its down position, aperture 22a is exposed and thus permits the flow through the secondary passage to pass through the aperture 22a. This reduces slightly the restriction to flow through the secondary passageway S and, thus, causes a small but abrupt decrease in the pressure drop across valve 31 just as the latter valve is about to close. Valve member 34 thereupon promptly moves by gravity to its closure and wedge locking position as described above. The action of the member 22 provides control over the flow rate at which closure of valve 31 will occur and, thus, the point of crossover-down in shutting down the use of the high flow rate meter 26. This closure action also assures positive closure of the primary valve and avoids leakage flow through the primary passageway.

The rate of flow at which member 22 moves to its up position and thereby the rate at which member 34 closes is well below the flow rate which would otherwise cause member 23 to reclose. Accordingly, member 23 will maintain its open position during this downward crossover of metering operations, and valve 31 will not reopen until such time as the flow rate again reaches the higher flow rate for crossover under increasing flow rate conditions. Thus, the opening conditions are significantly different (higher flow rate and pressure drop) than the closing conditions. Because valve member 34 opens only when the flow through the assembly has increased to a significantly higher flow (e.g., approximately 17 g.p.m.) and then resumes its closed position when the flow through the assembly has diminished to a lower flow (e.g., approximately 7 g.p.m.) thereby avoiding the annoying problem of valve oscillation or "chatter" commonly associated with prior apparatus. Moreover, all the benefits of dual metering and attendant accuracy over wide ranges of flow rates are maintained or improved.

By having the gate member 32 separate from weighted member 34, an improved seating and sealing action is obtained. Also, the gate member 32 may be readily formed of an inexpensive material and be replaced when desired. Thus, the cost of maintenance and replacement of the gate member is significantly reduced. As aforementioned, because gate member 32 engages and disengages the seal 33 by a pivotal movement rather than a sliding motion, there is no sliding friction created during the wedge locking and unlocking movements.

The trigger valve 21 may be utilized to control the operation of other types of valves, including but not limited to the primary passageway valve as shown in the aforementioned application. Similarly, the composite primary passageway valve may also be utilized in other installations.

A small opening, not shown, may be provided in member 23 to maintain a flushing flow through the meter 24 when both members 22 and 23 are in their up positions with respect to partition 20.

It is to be understood, of course, that other modifications and/or improvements may be incorporated, and the size and configuration and the relative location of the various components comprising the meter assembly may be varied from that shown without departing from the scope of the invention.

While a particular embodiment of this invention has been shown, it will be understood, of course, that the invention is not limited thereto since many modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

What is claimed is:

1. A meter assembly for accurately measuring variable liquid flow therethrough, said assembly comprising a housing having an inlet and outlet, and primary and secondary passageways in communication with said inlet and outlet; a first meter disposed within said primary passageway and being adapted to accurately measure high rates of liquid flow through said assembly; a second meter disposed within said secondary passageway and being adapted to accurately measure low rates of liquid flow through said assembly; a first valve disposed within said secondary passageway and movable to substantially a closed position when the liquid flow therethrough is increasing and has exceeded a first predetermined flow rate whereby a sudden pressure impulse is momentarily produced and the liquid flow is substantially diverted to said primary passageway; and a second valve disposed within said primary passageway and movable from a normally closed position to an open position when the sudden pressure impulse is momentarily exerted on the upstream side of said second valve and the liquid flow is diverted from the secondary passageway to said primary passageway, means for holding said second valve in a closed position with a predetermined locking force, said locking force being overcome by said pressure impulse to permit movement of said second valve to an open position; said second valve including first and second sections mounted for movement independently of one another, said first section being movable against a seat in said closed position to preclude flow through said primary passageway, and said second section engaging said first section to move said first section into said closed position and effect such holding of said first section in said closed position.

2. The meter assembly of claim 1 wherein the second section of said second valve is disposed downstream of said first section.

3. The meter assembly of claim 2 wherein the weight of the second section of said second valve is greater than the weight of said first section.

4. The meter assembly of claim 3 wherein, when the liquid flow through the primary passageway decreases below a predetermined second rate, the force of gravity effects movement of said first and second sections of said second valve from a fully open position to a closed position.

5. The meter assembly of claim 2 wherein the first section of said second valve being hingedly mounted and, when disposed in a closed position, being in sealing engagement with a seal delimiting an outlet end of said primary passageway.

6. The meter assembly of claim 5 wherein the second section of said second valve assumes a wedged position between a stationary member, disposed downstream of the primary passageway outlet end, and said first section when the latter is engaging said seal.

7. The meter assembly of claim 6 wherein the second section of said second valve is slidable and pivotal relative to said first section when said second valve moves to and from a closed position.

8. A meter assembly as in claim 2 wherein said second section of said second valve moves said first section thereof to said closed position by a first mode of closure, and said holding means including said second section and effecting said locking force by a second mode of closure.

9. A meter assembly as in claim 8 wherein said first section of said second valve is movable against said seat without sliding movement therealong.

10. A meter assembly as in claim 9 wherein said second section of said second valve is mounted for downward pivotal movement against said first section by gravity to effect such closure movement thereof, and means for effecting downward sliding and wedging movement of said second section against said first section by gravity for effecting said locking force against said first section.

11. The meter assembly of claim 1 wherein said first valve is of composite construction and includes an apertured first section and a second section, said sections being in substantially face to face relation when said first valve is in a substantially closed position.

12. The meter assembly of claim 11 wherein the first and second sections of said first valve are mounted for movement independently of one another between open and substantially closed positions.

13. A flow control assembly defining first and second passageways for flow of fluid therethrough; a first valve disposed in said first passageway and movable between open and closed positions in response to the rate of flow of fluid through said assembly; means for closing said first valve at a first predetermined rate of fluid flow through said assembly; and trigger valve means in said second passageway for controlling the opening and closing of said first valve; said trigger valve means including a first flow restriction element movable from a first position to a second position during said first predetermined rate of fluid flow through said assembly and thereby reducing the restriction to flow through said second passageway, and a second flow restriction element normally assuming an open position and movable to a substantially closed position when the liquid flow through said second passageway exceeds a second predetermined flow rate which is greater than said first predetermined flow rate, said second flow restriction element substantially increasing the restriction to flow through said second passageway when in said substantially closed position and causing said first valve to open, whereby said first valve is adapted to close when said second flow restriction element is in the open position and said first flow restriction element moves to its second position.

14. The flow control assembly of claim 13 wherein said first flow restriction element is an apertured plate defining within said passageway a restricted flow passage past said plate when said element is in said first position, and including means for covering said aperture when said element is in said first position.

15. The flow control assembly as in claim 14 wherein said aperture plate is disposed to normally be held in said first position by gravity.

16. The flow control assembly of claim 15 wherein said plate is pivotally mounted in said passageway for movement about a substantially horizontal axis.

17. The flow control assembly of claim 13 wherein said first flow restriction element comprises an apertured element and said second flow restriction element is substantially imperforate and movable independently of said first flow restriction element into abutting relation with said first element for substantially restricting flow through said aperture.

18. The flow control assembly of claim 17 wherein said flow restriction elements are normally held in said first position and said open position, respectively, by gravity.

19. The flow control assembly of claim 18 wherein each of said flow restriction elements is pivotally mounted in said second passageway.

20. The flow control assembly of claim 19 wherein each of said flow restriction elements is mounted for pivotal movement about a substantially horizontal common axis.

21. A meter assembly for accurately measuring variable liquid flow therethrough, said assembly comprising a housing having an inlet and outlet, and primary and secondary passageways in communication with said inlet and outlet; a first meter disposed within said primary passageway and being adapted to accurately measure high rates of liquid flow through said assembly; a second meter disposed within said secondary passageway and being adapted to accurately measure low rates of liquid flow through said assembly; a first valve disposed within said secondary passageway and movable to substantially a closed position when the liquid flow therethrough is increasing and has exceeded a first predetermined flow rate whereby a sudden pressure impulse is momentarily produced and the liquid flow is substantially diverted to said primary passageway; and a second valve disposed within said primary passageway and movable from a normally closed position to an open position when the sudden pressure impulse is momentarily exerted on the upstream side of said second valve and the liquid flow is diverted from the secondary passageway to said primary passageway; said first valve including first and second sections mounted for movement independently of one another, from first positions constituting an open position of said first valve to second positions constituting said substantially closed position thereof, said first section being movable from its first position to its second position at a first flow rate thereby reducing the resistance to flow through said secondary passageway, and said second section being movable from its first position to its second position at a higher flow rate thereby substantially precluding flow through said secondary passageway.

22. The meter assembly of claim 21 wherein said first section of said first valve is provided with an aperture therethrough for effecting such reduction of resistance to flow through said secondary passageway when in its second position, said second section of said first valve being substantially imperforate, and said sections being in substantially face to face relation whereby said second section substantially closes said aperture when said first valve is in said substantially closed position.

23. The meter assembly of claim 22 wherein said first and second sections of said first valve are so disposed that the force of gravity effects movement of said first and second sections from said second positions to said first positions when the pressure drop thereacross decreases below predetermined values.

24. The meter assembly of claim 21 wherein the first and second sections of said first valve are mounted for movement in the direction of normal flow through said secondary passageway in moving from said first positions to said second positions, and being in substantially horizontal positions when in said second positions whereby the force of gravity effects movement thereof to said first positions.

25. The meter assembly of claim 24 wherein said second section of said first valve is heavier than said first section of said first valve and said second section is disposed upstream relative to said first section.

26. A meter assembly for accurately measuring variable liquid flow therethrough, said assembly comprising a housing having an inlet and outlet, and primary and secondary passageways in communication with said inlet and outlet; a first meter disposed within said primary passageway and being adapted to accurately measure high rates of liquid flow through said assembly; a second meter disposed within said secondary passageway and being adapted to accurately measure low rates of liquid flow through said assembly; a first valve disposed within said secondary passageway and movable to substantially a closed position only when the liquid flow therethrough is increasing and has exceeded a first predetermined flow rate whereby a sudden pressure impulse is momentarily produced and the liquid flow is substantially diverted to said primary passageway; said first valve being of composite construction and including an apertured first section and a substantially imperforate second section, said sections being hingedly mounted about a substantially horizontal axis for movement independently of one another between an open position of said first valve and said substantially closed position thereof; said sections being in substantially face to face relation when said first valve is in said closed position; and a second valve disposed within said primary passageway and movable from a normally closed position to an open position when the sudden pressure impulse is momentarily exerted on the upstream side of said second valve and the liquid flow is diverted from the secondary passageway to said primary passageway.

27. The meter assembly of claim 26 wherein said second valve includes first and second sections mounted for movement independently of one another, said first section being movable against a seat in said closed position to preclude flow through said primary passageway, and said second section engaging said first section to move said first section into said closed position and effect such holding of said first section in said closed position.

28. The meter assembly of claim 26 wherein the force of gravity effects movement of the first and second sections of said first valve from a substantially closed position to an open position, when the pressure drop thereacross decreases below a predetermined value.

29. The meter assembly of claim 28 wherein the second section of said first valve is heavier than the first section of said first valve and said second section is disposed upstream relative to said first section.

* * * * *